(12) United States Patent
Fanning et al.

(10) Patent No.: US 7,162,934 B2
(45) Date of Patent: Jan. 16, 2007

(54) SINGLE-SHAFT SWITCHING DEVICE

(75) Inventors: Andrew Fanning, Farmington Hills, MI (US); Peter Hartig, Plymouth, MI (US); Martin Bürkle, Canton, MI (US)

(73) Assignee: ZF Friedrichshafen AG, Friedrichshafen (DE)

(*) Notice: Subject to any disclaimer, the term of this patent is extended or adjusted under 35 U.S.C. 154(b) by 638 days.

(21) Appl. No.: 10/474,597

(22) PCT Filed: Apr. 16, 2002
(Under 37 CFR 1.47)

(86) PCT No.: PCT/EP02/04178

§ 371 (c)(1),
(2), (4) Date: Oct. 9, 2003

(87) PCT Pub. No.: WO03/008844

PCT Pub. Date: Jan. 30, 2003

(65) Prior Publication Data
US 2005/0166698 A1 Aug. 4, 2005

(30) Foreign Application Priority Data
Apr. 20, 2001 (DE) ............ 101 19 343

(51) Int. Cl.
*F16H 63/08* (2006.01)

(52) U.S. Cl. .................. 74/473.25; 74/473.26

(58) Field of Classification Search ............ 74/473.24, 74/473.25, 473.26, 473.28, 473.36
See application file for complete search history.

(56) References Cited

U.S. PATENT DOCUMENTS 2,438,455 A * 3/1948 Roeder et al. ............ 74/473.24
2,962,914 A * 12/1960 Peras .................... 74/473.26
5,737,969 A 4/1998 Brown et al. ............ 74/477
6,026,702 A 2/2000 Dreier et al. ............ 74/473.21

FOREIGN PATENT DOCUMENTS

| DE | 1 125 730 | 3/1962 |
| DE | 41 15 675 A1 | 6/1992 |
| DE | 195 28 460 1 | 10/1996 |
| JP | 59121414 | 7/1984 |

* cited by examiner

Primary Examiner—William C. Joyce
(74) Attorney, Agent, or Firm—Davis & Bujold, P.L.L.C.

(57) ABSTRACT

In a shifting system (2) for a vehicle transmission which comprises a shifting shaft (6), at least one gear change hub (18) is movably placed in a transmission housing (4) upon the shifting shaft (6). The shifting shaft (6) has at least one shifting pin (30) which with the shifting shaft (6) is rotatable around an axis of rotation (12) and which with the shifting shaft (6) is movable along the axis of rotation (12). Depending on the position of rotation of the shifting shaft (6), the shifting shaft (6) moves with the shifting pin (30) the gear change hub (18). The shifting pin (30), which upon shifting moves the selected gear change hub (18), is placed outside the gear change hub (18) and engages in a bracket (46) connected with the gear change hub (18) and projects from the gear change hub (18). On the outer surface, the gear change hub (18) has one slot (34) in which a locking device (36, 38, 42) is slidingly placed.

15 Claims, 5 Drawing Sheets

SINGLE-SHAFT SWITCHING DEVICE

This application is a national stage completion of PCT/EP02/04178 filed Apr. 16, 2002 which claims priority from German Application Serial No. 101 19 343.2 filed Apr. 20, 2001.

FIELD OF THE INVENTION

The invention concerns a shifting system having one shifting shaft.

BACKGROUND OF THE INVENTION

Different systems are known for shifting vehicle transmissions. U.S. Pat. No. 6,026,702 shows a shifting system having only one shifting shaft for six gears of which one gear can be a reverse gear. In the separate shifting forks, spring-mounted pins engage with which the shifting forks can be locked in a determined position relative to the transmission housing. On the inner side of the part of the shifting fork situated upon the shifting shaft and penetrating the shifting shaft, apertures and slots are provided in which the pins can move. At the same time with each shifting fork is associated one pin which, by rotation of the shifting shaft, can engage in the shifting fork in a manner, such that in a certain torsional position of the shifting shaft, the shifting fork is moved along when the shifting shaft axially moves. For this purpose by the pin one other pin which, as a locking pin, carries out a locking function and sits in the transmission housing, is pressed into the transmission housing against the pressure of a spring and releases the shifting fork so that it can be axially moved. For penetrating the locking pin, one other aperture must be provided in the shifting fork so that in the shifting fork, together with the four slots for guiding the pin connected with the shifting shaft in the non-shifted state of the shifting fork, still one other aperture is provided for the locking pin. In the area of the aperture, the shifting fork is then also additionally machined so that the locking pin can be pressed by the spring into three different recesses which correspond to the current shifting state of the shifting fork. The shifting fork, made of high quality material or at least the guide thereof into the shifting shaft, must therefore be processed during the production stage so that the four slots, the aperture for the locking pin and the recesses of the locking pin can be put in place. This means high expenditure in finishing technique which requires both time and financial resources.

The problem on which the invention is based is to indicate a shifting system which is easy to produce and can be used of different shifting forks or shifting rocking arms.

SUMMARY OF THE INVENTION

According to the invention, it is provided to produce a shifting system for a vehicle transmission in a transmission housing which comprises one shifting shaft for all gears to be shifted and upon which at least one gear change hub is movably placed. Within the gear change hub, the shifting shaft can be rotated and has at least one shifting pin rotatable with the shifting shaft around an axis of rotation. Likewise, the shifting pin is movable with the shifting shaft along the axis of rotation. Depending on the rotation of the shifting shaft, the shifting shaft can move the gear change hub with the shifting pin. The shifting pin, which upon shifting, moves the selected gear change hub situated outside the gear change hub. Thereby the inner bore of the gear change hub is processed only for the gear change hub to the shifting shaft and has no grooves or slots like the shifting forks of the prior art. The processing of the gear change hub is thereby substantially simplified and can be equally designed for every kind and size of shifting forks or shifting rocking arms. For this purpose, the shifting fork must be connected only with the adequately shaped, shifting fork of the shifting rocking arm. The gear change hub can be made integral with a shifting fork or shifting rocking arm, but it can also be made as a separate part and then connected with the shifting fork or shifting rocking arm by an adequate process, such as welding or screwing. In an advantageous development, the shifting pin engages in a bracket connected with the gear change hub and projecting from the gear change hub which can also have recesses in which engages one detent element in the current shifting position. The detent element advantageously comprises a coil spring which supports itself against the transmission housing and there presses a piston into the relevant recess. The bracket is preferably fastened on the gear change hub with at least one connecting element, such as a screw or a rivet. In one development, the bracket is directly cast in the gear change hub. In an advantageous development, the gear change hub has a slot on its outer surface in which a locking device is slidingly placed. The locking device comprises a sliding rail, a locking pin situated on the sliding rail and engaging in the gear change hub and, opposite the shifting pin and situated on the sliding rail, a receptacle for a spring element. The spring element supports itself on the transmission housing and presses the shifting pin situated on the sliding rail in a direction toward the gear change hub into a recess formed in the slot of the gear change hub. The receptacle for that preferably forms one sleeve in which a coil spring is situated as spring element. In an advantageous development, the shifting pin, lying outside the gear change hub and associated with the gear change hub that must be engaged, also actuates the locking device on the gear change hub that must be shifted at the time. In an especially advantageous design, all gear change hubs, all locking devices and all brackets projecting from the gear change hub have the same shape. This considerably reduces the expenditure in parts of different kinds in the transmission. The gear change hub can advantageously be connected with a shifting fork or with a shifting rocking arm or part of such a shifting fork or shifting rocking arm. In a particularly advantageous development, the gear change hub and, optionally, the shifting fork or the shifting rocking arm are made of a plastic material while the shifting pin in the shifting shaft, the bracket and the locking device consist of metal.

An essential advantage of the shifting system consists in its modular construction. Thereby the bracket projecting from the gear change hub, the locking devices, the gear detent, the shifting pin, the support of the shifting shaft and, optionally, the gear change hub can be used for any kind of automatic transmission. Only the length of the shifting shaft, the arrangement of the shifting pins upon the shifting shaft and the relevant shifting forks or shifting rocking arms, either as complete element placed upon the shifting shaft or as partial element connected with the gear change hub, have to be changed and adapted to the current requirements.

BRIEF DESCRIPTION OF THE DRAWINGS

The invention will now be described, by way of example, with reference to the accompanying drawings in which.

DETAILED DESCRIPTION OF THE INVENTION

Figure 1:
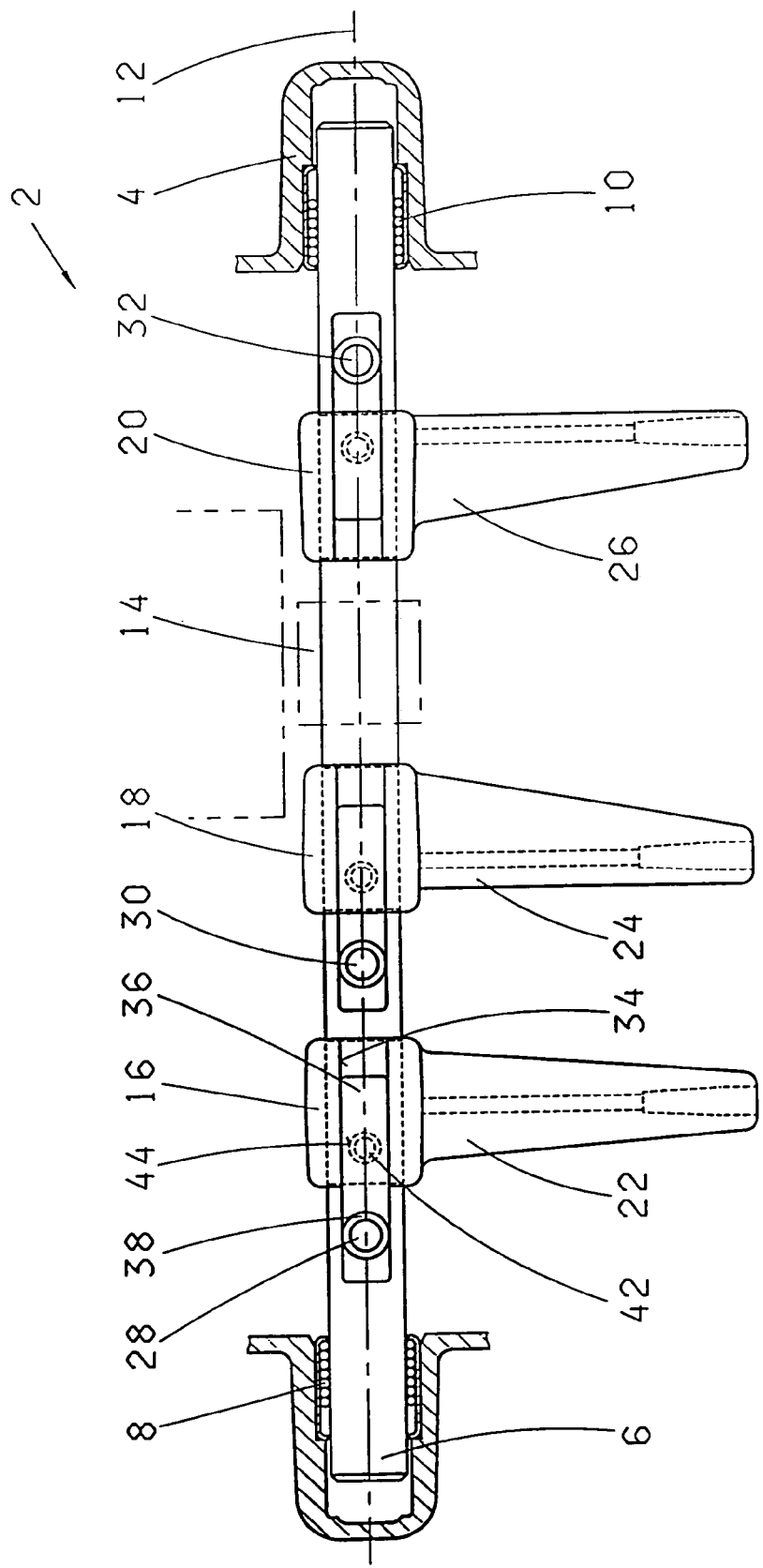
FIG. 1 is a side view of the shifting system.

FIG. 1 is a side view diagrammatically showing the shifting system 2 in a transmission housing 4 (not shown in detail). A shifting shaft 6 is supported in the transmission housing 4 on two bearings 8 and 9 so as to allow the shifting shaft 6 to rotate around an axis of rotation 12 and axially to move along the axis of rotation 12 for which purpose sufficiently large apertures are provided in the transmission housing 4. The shifting shaft 6 is rotated and moved by a gear shift mechanism 14 (not shown in detail), which is connected with a manual gear change lever (not shown) or an automated actuator. Upon the shifting shaft, three gear change hubs 16, 18 and 20 are placed which, in the example shown here, are designed in one piece with three shifting forks 22, 24, 26. The shifting shaft is penetrated by three shifting pins 28, 30 and 32, such as shown in detail in FIG. 8 and FIG. 2. One shifting pin 28, 30, 32 is associated with each shifting shaft 22, 24, 26, the relevant shifting pin not situated within the associated gear change hub, but being located outside the associated gear change hub at a specific distance from the gear change hub. In a slot 34 on the gear change hub 16 is located a sliding rail 36 wherein the gear change hub 16 be axially moved along the axis 12 and the sliding rail 36 is retained axially firmly in the transmission housing via a sleeve 38. A coil spring 40 (FIG. 2) placed within the sleeve 38 presses the sliding rail 36 in direction to the gear change hub 16, i.e. in direction perpendicular to the drawing plane in FIG. 1. A locking pin 42 is situated on the sliding rail 36, which can engage in a recess 44 on the gear change hub 16 thereby preventing the axial movement of the gear change hub 16. The other gear change hubs 18 and 29 (shown) have corresponding devices, the illustrations for the gear change 16 representing them.

Figure 2:
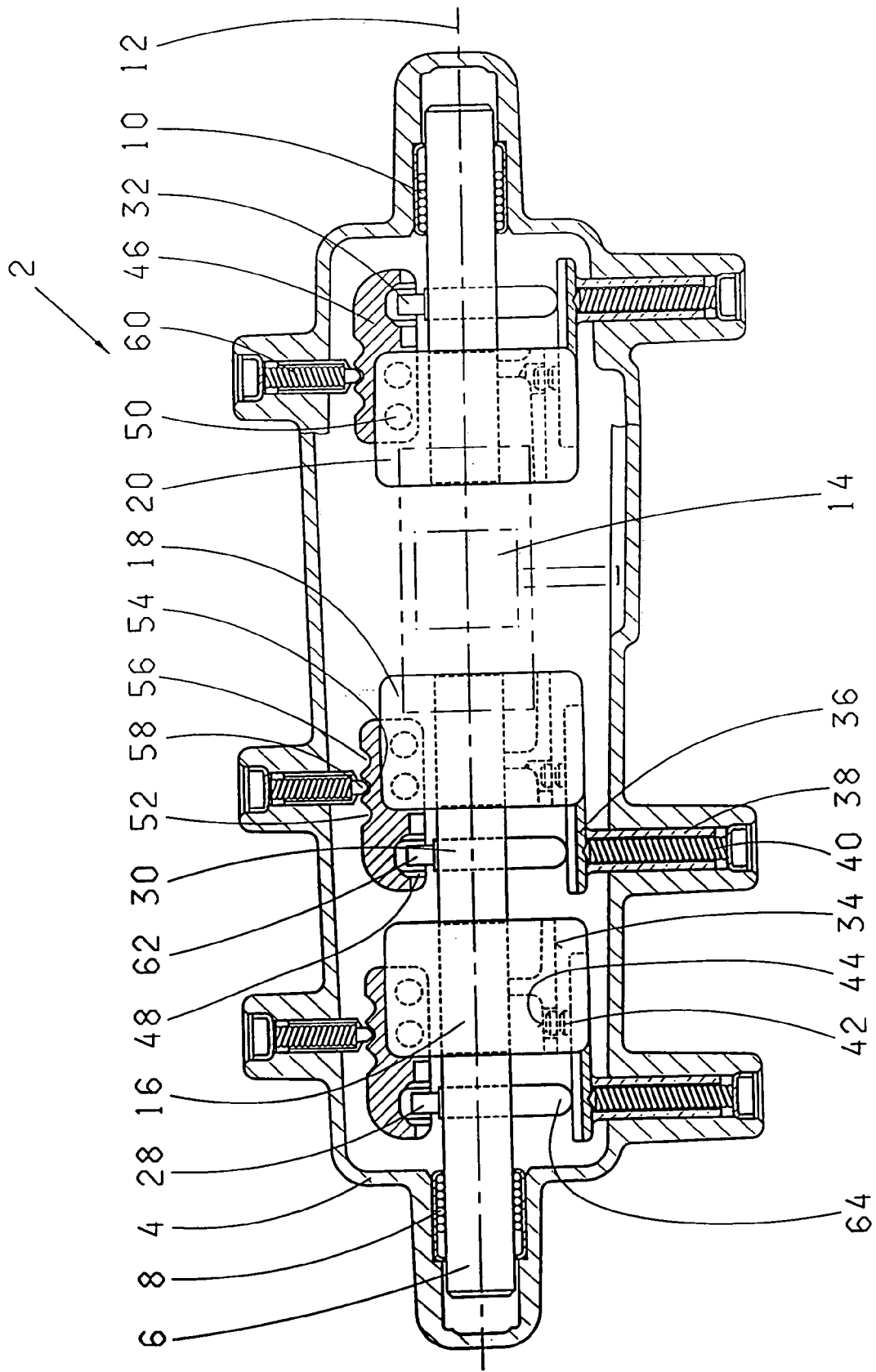
FIG. 2 is a view on the shifting system.
Figure 6:
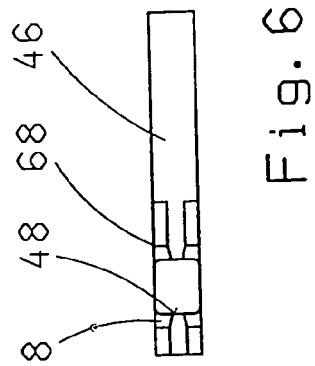
FIG. 6 is a view on a bracket.
Figure 5:
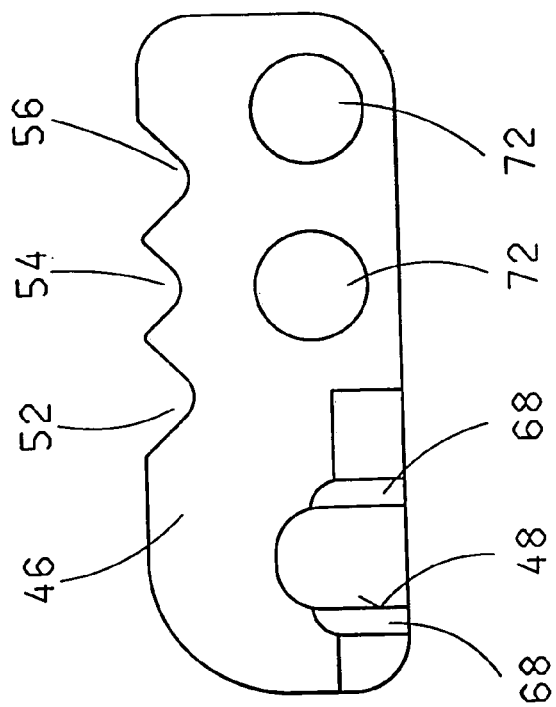

In FIG. 2, by way of example, for all gear change hubs is shown a bracket 16 placed on the gear change hub 18, as shown in detail in FIG. 5 and in FIG. 6. The bracket 46 is fastened on the gear change hub 18 and is movable together with it. The fastening is made, e.g., directly during the manufacturing process of the gear change hub by bracket 46 being cast with the gear change hub 18 or the bracket being fastened on the gear change hub 18 by fastening elements such as screws 50. The bracket 46 can consist here, e.g., of a sintered metal material. The bracket 46 has one aperture 48 in which the shifting pin 30 can engage and through which shifting pin 30 can be guided during a rotation of the shifting shaft 6. In bracket 46, three recesses 52, 54 and 56 are provided in which the piston 58 of a detent device can optionally engage. In the position shown in FIG. 2, the piston 58 engages in the recess 54, which corresponds to a middle position or neutral position of the gear change hub 18. In this position, no gear is changed by the gear change hub 18. The recesses 52 and 56 lying next correspond to the two opposite gear change positions of the gear change gate. In these positions, the gear change hub 18 and, thereby the shifting fork or shifting rocking arm connected therewith, is held by a piston 58. For this purpose, the piston 58 is pressed into the relevant recess by a coil spring 60 which supports itself against the transmission housing 4. For axial movement of the bracket 46 and of the gear change hub 18, the tension of the coil spring 60 has to be overcome. In a torsional position of the shifting shaft 6, the shifting pin 30 stands by a point 62 precisely in the aperture 48 of the bracket 46. If the shifting shaft 6 is now axially moved along the axis 12, the shifting pin 30 with its point 62 takes along the bracket 46 in the direction of movement of the shifting shaft 6. During the axial movement of the bracket 46, the piston 58 is pressed out of one of the recesses against the tension of the coil spring 60 and releases the bracket 46 at the same time. The piston 58 then slips into the adjacent recess after the bracket 46 has axially moved as far as the distance of the recesses allows. In the torsional position of the shifting pin 30, in which it is in position to axially move the bracket 26, the other point 64 of the shifting pin 30 located opposite the point 62 presses the sliding rail 36 against the tension of the coil spring back in direction of the transmission housing 4. Thereby the locking pin 42 is pressed out of the recess 44 and releases the gear change hub 18 for axial movement. Therefore, the shifting pin 30 serves simultaneously for engaging the desired gear and unlocking the gear change hub to be engaged.

Figure 3:
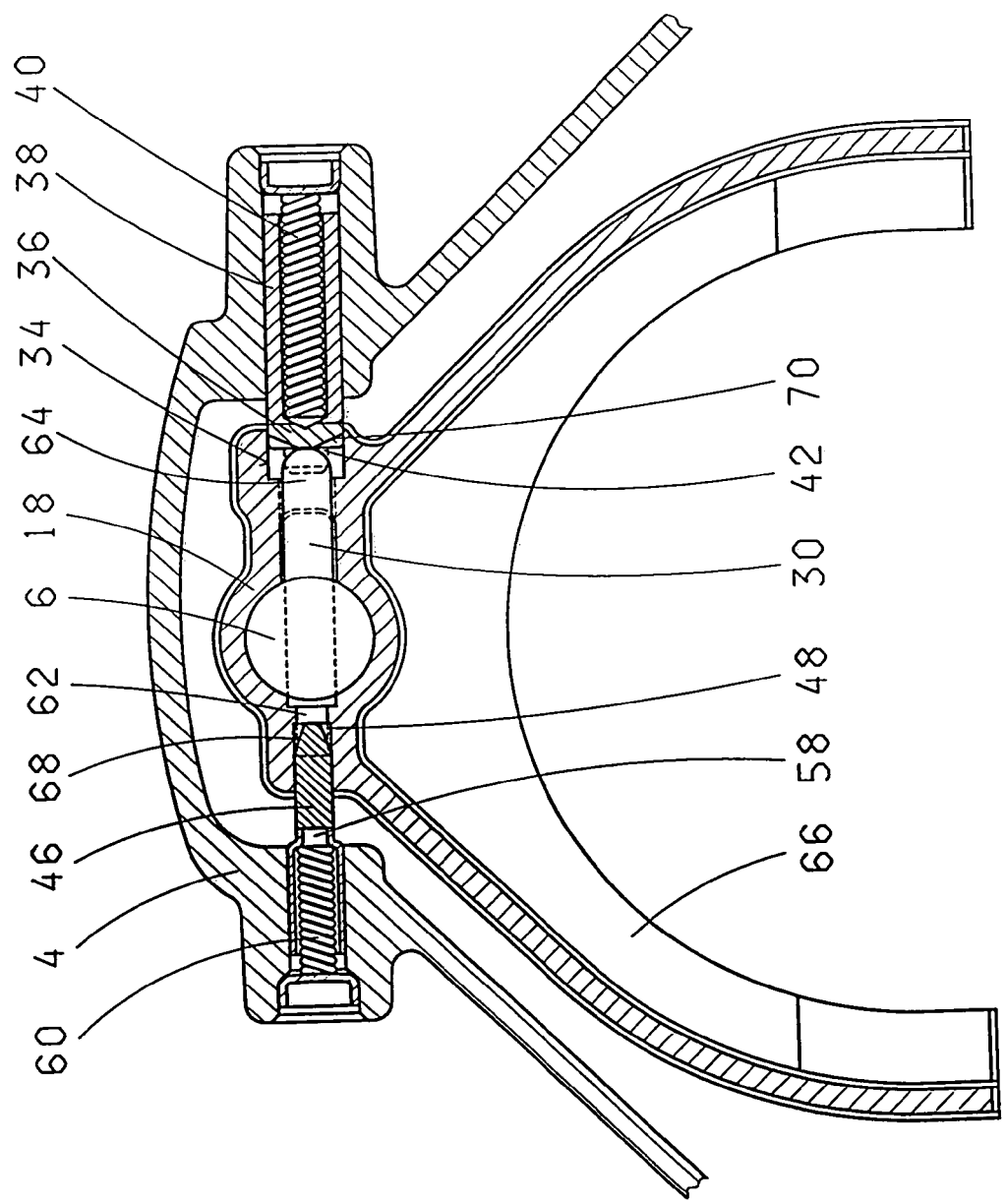
FIG. 3 is a section through a shifted shifting fork.

FIG. 3 shows a shifting fork 66 which is made integral with the gear change hub 18. The shifting shaft 6 is rotated so that in the position shown the gear change hub 18 can be moved by the shifting shaft 6 perpendicularly to the plane of the drawing. The point 62 of the horizontally lying shifting pin 30 engages in the bracket 46 and the point 64 of the shifting pin 30 presses the sliding rail 36 with its sleeve 36 to the right against the spring 40 in the drawing plane. Thereby the locking pin 42 no longer engages in the gear change hub 18 but lies free in the recess 44. The aperture 48 in the bracket 46 in which the shifting pin 30 engages with its point 62 has sloped surfaces 68 so that the point 62 can more easily thread into the aperture 48. The sliding rail 36 likewise has in the area of the point 64 of the shifting pine 30 sloped surfaces 70 in order that during torsion of the shifting shaft 6 the point 64 can more easily press back the sliding rail 36.

Figure 4:
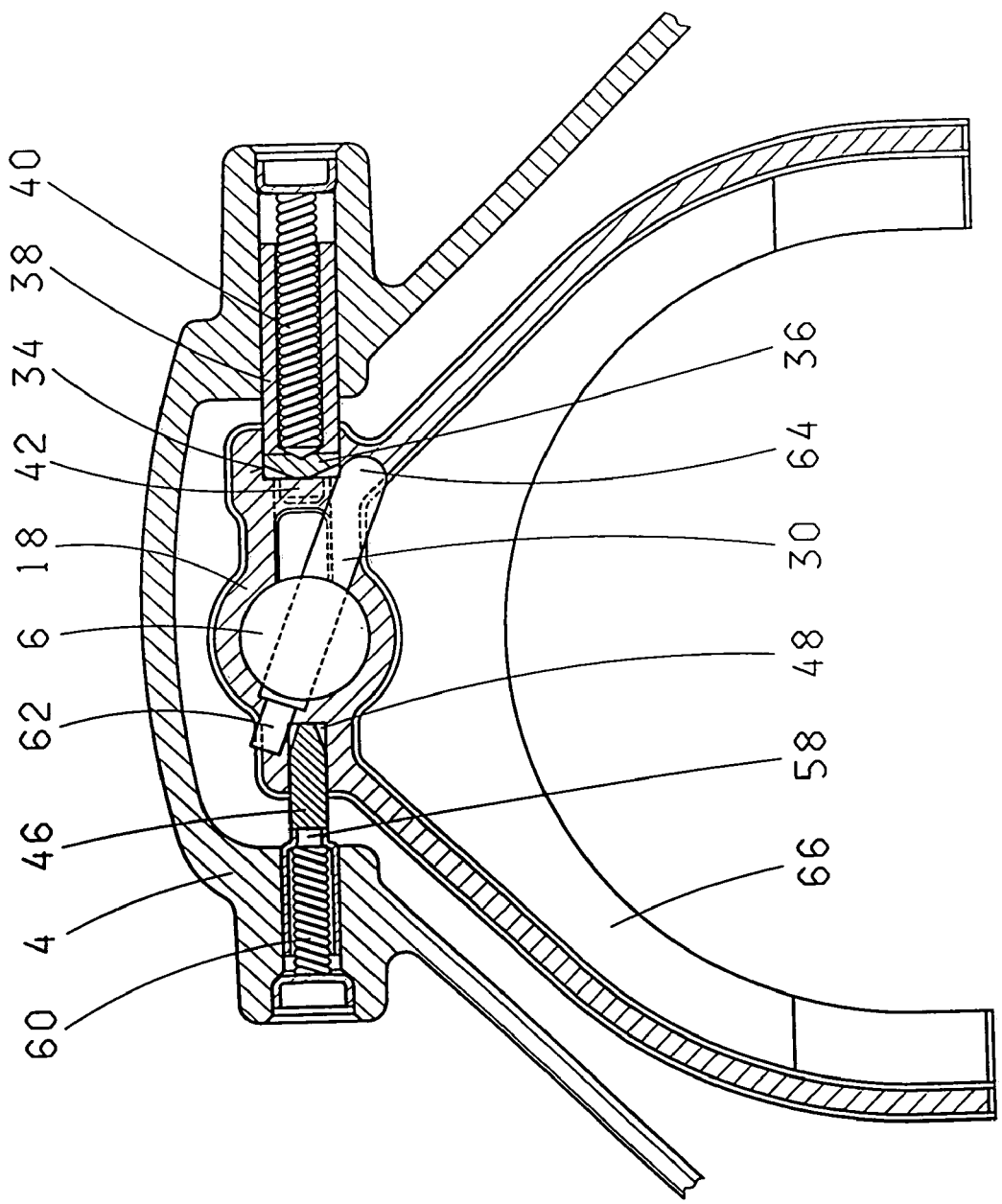
FIG. 4 is a section through a non-shifted shifting fork.

FIG. 4 shows the arrangement of FIG. 3 with a shifting shaft 6 turned for the purpose. The point 62 no longer lies in the aperture 48 and the point 64 of the shifting pin 30 no longer presses upon the sliding rail 36. Thereby the locking pin 42 engages in the gear change hub 18 and blocks its freedom of axial movement. In this position, the gear change hub 18 cannot be moved by the shifting shaft 6 perpendicularly to the drawing plane but is locked relative to the transmission housing.

FIG. 5 and FIG. 6 show a partly enlarged representation of the bracket 46. Sloped surfaces 68 are provided in aperture 48. To stop the gear change hub, recesses 52, 54 and 56 are provided. Through the aperture 72, screw threads can be passed in order to fasten the bracket 16 on a gear change hub.

Figure 7:
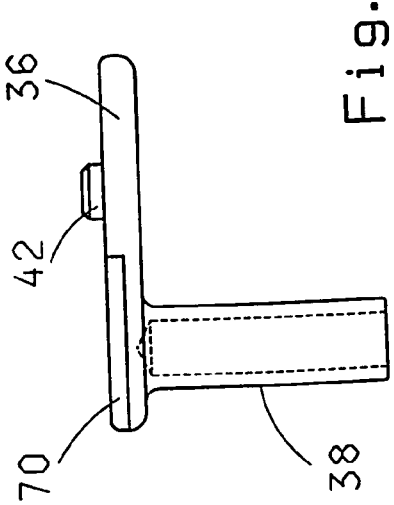
FIG. 7 is a locking device.

FIG. 7 shows a locking device with the sliding rail 36 which has a locking pin 42 and a sleeve 38 in which lies a coil spring (not shown here). The sliding rail 36 has two sloped surfaces 70 in order that the sliding rail 36 can be more easily pressed back by a point 64 of the shifting pin 30.

Figure 8:
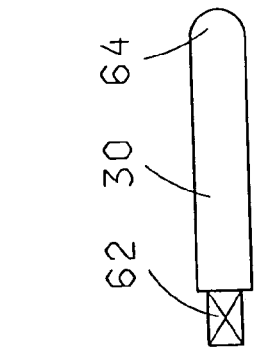
FIG. 8 is a shifting pin.

FIG. 8 shows a shifting pin 30 with a point 62 which engages in the bracket 46 and with a point 64 which presses upon the sliding rail 36.

REFERENCE NUMERALS 2 shifting system
4 transmission housing
6 shifting shaft 8 support
10 support
12 axis of rotation
14 shifting mechanism
16 gear change hub
18 gear change hub
20 gear change hub
22 shifting fork
24 shifting fork
26 shifting fork
28 shifting fork
30 shifting pin
32 shifting pin
34 slot
36 sliding rail
38 sleeve
40 coil spring
42 locking pin
44 recess
48 aperture
50 screw
52 recess
54 recess
56 recess
58 piston
60 coil spring
62 point
64 point
66 shifting fork
68 surface
70 surface
72 aperture

The invention claimed is:

1. A shifting system (2) for a motor vehicle transmission in a transmission housing (4) which comprises one shifting shaft (6) upon which gear change hubs (18) are movably disposed and which has at least one shifting pin (30) located outside one of said gear change hubs (18) which with said shifting shaft (6) is rotatable around an axis of rotation (12) and with said shifting shaft (6) is movable along said axis of rotation (12) and at the same time, according to rotation of said shifting shaft (6), moves one of said gear change hubs (18) with said shifting shaft (6), said shifting pin (30) engaging in one tongue (46) extending from an end of said gear change hub (18), wherein said shifting pin (30) lying outside said gear change hub (18) and coordinated with the one gear change hub (18) to be shifted, actuates one locking device (36, 38, 42) positioned on an opposite side of the gear change hub (18) with respect to said tongue.

2. The shifting system (2) according to claim 1 wherein said gear change hub (18) has on an outer surface one slot (34) in which said locking device (35, 38, 42) is slidingly disposed.

3. The shifting system (2) according to claim 1 wherein said locking device comprises a sliding rail (36) and a locking pin (42) situated on said sliding rail (36) and engaging in said gear change hub (18) and, situated opposite said sliding rail (36) is one receptacle (38) for a spring element (40) which supports itself on said transmission housing (4) and presses said locking pin (42) situated on said sliding rail (36) in a direction toward said gear change hub (18).

4. The shifting system (2) according to claim 3 wherein said receptacle for said spring element forms one sleeve (38) where one spiral spring (40) is located.

5. The shifting system (2) according to claim 1 wherein said tongue (46) projecting out of said gear change hub (18) has recesses (52, 54, 56) in which a detent element (58, 60) engages in a relevant shifting position.

6. The shifting system (2) according to claim 5 wherein said detent element comprises one spiral spring (60) which is supported against said transmission housing (4) and presses one piston (58) into the relevant recess (52, 54, 56).

7. The shifting system (2) according to claim 1 wherein said tongue (46) is secured to said gear change hub (18) by at least one connecting element (50).

8. The shifting system (2) according to claim 1 wherein said tongue (46) is integrally cast directly in said gear change hub (18).

9. The shifting system (2) according to claim 1 wherein said gear change hub (18) is made of plastic material and said tongue (46), said shifting pin (30) in said shifting shaft (6) and said locking device (38, 38, 42) consist of metal.

10. The shifting system (2) according to claim 1 wherein said gear change hub (18) is connected with a shift fork (66) or is part of the shift fork (66).

11. The shifting system (2) according to claim 1 wherein said gear change hub (18) is actuated with a gear change mechanism.

12. The shifting system (2) according to claim 1 wherein an gear change hubs (16, 18, 20), all locking devices (36, 38, 42) and all tongues (46) are each designed the same.

13. A gear change hub (18) for a motor vehicle transmission having one shifting shaft (6), said gear change hub (18), which is connected with a shift fork (66) and on which one tongue (46) projecting from an end of said gear change hub (18) is provided which for shifting the motor vehicle transmission can be connected with a shifting-pin (30) on said shifting shaft (6) outside said gear change hub (18), wherein a locking device extends from an opposite side of the gear change hub (18), with respect to said tongue, and can be actuated by said shifting pin (30).

14. The gear change hub according to claim 13 wherein said tongue (46) projecting out of said gear change hub (18) has recesses (52, 54, 56) in which one detent element (58) engages in the relevant shifting position.

15. The gear change hub according to claim 13 wherein said locking device comprises one slot (34) and one recess (44).

* * * * *